United States Patent
Ohkubo

(10) Patent No.: US 7,498,069 B2
(45) Date of Patent: Mar. 3, 2009

(54) OPTICAL RECORDING MEDIUM, OPTICAL RECORDING METHOD, AND OPTICAL RECORDING APPARATUS

(75) Inventor: Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 574 days.

(21) Appl. No.: 11/180,699

(22) Filed: Jul. 14, 2005

(65) Prior Publication Data

US 2006/0013114 A1 Jan. 19, 2006

(30) Foreign Application Priority Data

Jul. 15, 2004 (JP) ............... 2004-208076
Jun. 21, 2005 (JP) ............... 2005-181139

(51) Int. Cl.
*B32B 3/02* (2006.01)
(52) U.S. Cl. .......... 428/64.1; 428/64.4; 428/64.5; 430/270.13
(58) Field of Classification Search .......... 428/64.1, 428/64.4, 64.5; 430/270.13
See application file for complete search history.

(56) References Cited

U.S. PATENT DOCUMENTS

| | | | | |
|---|---|---|---|---|
| 4,904,577 A | * | 2/1990 | Tyan et al. | 430/270.13 |
| 4,947,372 A | * | 8/1990 | Koshino et al. | 365/106 |
| 4,954,379 A | * | 9/1990 | Nishida et al. | 428/64.6 |
| 5,221,588 A | * | 6/1993 | Morimoto et al. | 430/19 |
| 5,254,382 A | * | 10/1993 | Ueno et al. | 428/64.5 |
| 5,637,372 A | * | 6/1997 | Tominaga et al. | 428/64.1 |
| 5,709,978 A | * | 1/1998 | Hirotsune et al. | 430/270.13 |
| 7,002,896 B2 | * | 2/2006 | Nishihara et al. | 369/275.2 |
| 7,027,371 B2 | * | 4/2006 | Nobukuni et al. | 369/47.54 |
| 7,105,217 B2 | * | 9/2006 | Ohno et al. | 428/64.1 |
| 2004/0166439 A1 | * | 8/2004 | Ohkubo | 430/270.13 |

FOREIGN PATENT DOCUMENTS

| | | |
|---|---|---|
| JP | 01-302551 A | 12/1989 |
| JP | 3-042276 A | 2/1991 |
| JP | 5-016528 A | 1/1993 |
| JP | H09-293269 | 11/1997 |
| JP | 2001-232941 A | 8/2001 |
| JP | 2001-322357 | 11/2001 |
| JP | 2002-211137 A | 7/2002 |
| JP | 2002-240432 | 8/2002 |
| JP | 2005-100581 A | 4/2005 |

* cited by examiner

*Primary Examiner*—Elizabeth Mulvaney
(74) *Attorney, Agent, or Firm*—Dickstein, Shapiro, LLP.

(57) ABSTRACT

An optical recording medium has a substrate, and a recording film whose status is changed by irradiating with a laser beam. The recording film includes $(\alpha Te)_x \beta Te_3$ as a major component (x is a positive real number). The $\alpha$ is selected from the group consisting of $Ge_{1-a}Sn_a$ and $Ge_{1-a}Pb_a$ (a is a real number not less than 0 and not more than 1). The $\beta$ is selected from the group consisting of $Sb_{2-y}In_y$, $Sb_{2-y-z}In_yBi_z$ and $Bi_{2-y}In_y$ (y and z are real numbers more than 0 and less than 2; y+z is more than 0 and less than 2).

27 Claims, 4 Drawing Sheets

17: SUBSTRATE
16: UV RESIN LAYER
15: REFLECTIVE FILM
14: PROTECTIVE FILM
13: RECORDING FILM
12: PROTECTIVE FILM
11: SUBSTRATE

LASER BEAM

OPTICAL RECORDING MEDIUM, OPTICAL RECORDING METHOD, AND OPTICAL RECORDING APPARATUS

BACKGROUND OF THE INVENTION

1. Field of the Invention

The present invention relates to a phase-change optical recording medium, a method of recording data on to the phase-change optical recording medium, and an optical recording apparatus which records data on to the phase-change optical recording medium.

2. Description of the Related Art

As a rewritable optical disk (rewritable optical recording medium), a "phase-change optical disk" as typified by a CD-RW or a DVD-RW is known. The phase-change optical disk has a phase-change recording film whose status changes between the crystalline status and the amorphous status in a reversible fashion. Data is recorded on to the phase-change optical disk by irradiating the recording film with a laser beam and thereby changing a reflection coefficient of the recording film or an optical phase. The recording film is in the amorphous status immediately after the optical disk is manufactured. In the initializing process, the optical disk is irradiated with a laser beam, and thus the recording film is crystallized. After that, the recording film at a desired spot is amorphized by irradiating the desired spot on the optical disk with a laser beam, and thereby the data is recorded. The amorphized spot is called a "mark (amorphous mark)".

Known as compositions of the recording film of a typical phase-change optical disk are GeTe, SbTe, GeSbTe, InSbTe, AgInSbTe and so on.

For example, Japanese Laid Open Patent Application JP-P2002-240432A discloses an optical recording medium having at least a phase-change optical recording layer. The phase-change optical recording layer is constituted mainly of Sb(x)-Te(y) wherein x/y=1 to 4. In addition, the phase-change optical recording layer includes at least one element selected from the group of B, Al, Si, Ga, Ge, Ag, In, Sn, Ba, La, Au, Bi and Gd as an additional element. For example, the phase-change optical recording layer is constituted of GeGaSbTe, in which relative proportions of respective elements are Ge-3 at %, Ga-7 at %, Sb-65 at %, and Te-25 at %.

Japanese Laid Open Patent Application JP-P-Heisei-9-293269 discloses another phase-change optical recording medium. The phase-change optical recording medium has a substrate, a first dielectric film on the substrate, a recording film on the first dielectric film, a second dielectric film on the recording film, and a reflective film on the second dielectric film. The recording film is constituted of $(GeSbTe)_x(In_ySb_{1-y})_{1-x}$. Thus, crystalline "GeSbTe" and amorphous "InSb" coexist in the recording film.

Recently, a variety of signal processing methods are introduced for the purpose of increasing the storage capacity of the phase-change optical disk. Also, a "land and groove recording method" is introduced, in which data are recorded on to both land and groove used for tracking. Also, a super-resolution playing technology is introduced, which enables the playing of fine marks smaller than an optical diffraction limit.

Also, there are increasing needs for an increase in recording speed as well as an increase in storage capacity. As for optical disk drives supporting the CD-R and the DVD-R, for example, such disk drives with improved recording speed are continuously marketed.

In order to realize an increase of the recording speed (referred to as a "high-speed recording" hereinafter) in the phase-change optical disk, it is necessary to increase a crystallization speed of the phase-change recording film. It is desired to improve the crystallization speed and hence ensure a sufficient erasability even in a condition of a high linear velocity.

For example, Japanese Laid Open Patent Application JP-P2001-322357A discloses a technique for improving the crystallization speed of the recording film. According to the technique, in a recording film of GeTe-Sb$_2$Te$_3$ series, a part of GeTe is replaced by SnTe. This idea utilizes a nature that the crystallization speed of SnTe is higher than that of GeTe. The increase in the crystallization speed is realized by replacing a portion of GeTe by SnTe.

However, generally speaking, when the crystallization speed is increased, crystallization temperature of the recording film is lowered. As a result, the recorded data (amorphous mark) is more likely to disappear. In other words, the increase in the crystallization speed causes deterioration of data holding characteristic (storage stability). Moreover, the increase in the crystallization speed causes increase in a so-called "cross erase". The cross erase means a phenomenon that when data is recorded on a certain track under a condition of narrow track pitch, a mark existing on the adjacent track is erased. Although the cross erase is more likely to occur due to the narrow track pitch as mentioned above, narrowing the track pitch is important from a view point of increasing the storage capacity.

It is desired not only to improve the crystallization speed but also to reduce the cross erase. That is to say, it is strongly desired to establish a technique which can realize both the "high-speed recording" and the "high storage capacity" in the phase-change optical disk.

SUMMARY OF THE INVENTION

It is therefore an object of the present invention to provide a technique which can achieve both the high-speed recording and the enhancement of the recording density in an optical recording medium.

Another object of the present invention is to provide an optical recording medium which can increase the crystallization speed without deteriorating the storage stability of its recording film.

Still another object of the present invention is to provide an optical recording medium which can improve the crystallization speed without increasing the cross erase.

In a first aspect of the present invention, an optical recording medium is provided, on which data is recorded by irradiating the optical recording medium with a laser beam. The optical recording medium has a substrate and a recording film formed on the substrate. Due to a laser beam irradiation, properties such as a reflection coefficient of the recording film and an optical phase are changed, and thereby the data is recorded on to the optical recording medium.

The recording film according to the present invention includes $(\alpha Te)_x \beta Te_3$ as a major component (x is a positive real number). Here, the $\alpha$ is any of $Ge_{1-a}Sn_a$ and $Ge_{1-a}Pb_a$ (a is a real number not less than 0 and not more than 1). The $\beta$ is any of $Sb_{2-y}In_y$, $Sb_{2-y-z}In_yBi_z$ and $Bi_{2-y}In_y$ (y and z are real numbers more than 0 and less than 2; y+z is more than 0 and less than 2).

The inventor found that it is possible not only to enhance the crystallization speed but also to suppress the cross erase by using the recording film mentioned above. More specifically, by replacing a part of Ge by Sn or Pb, the crystallization speed is increased and thus a sufficient erasability is ensured even in a condition of the high linear velocity. Also, by replacing a part of Sb or all Sb by In and/or Bi, the storage stability of the record film is improved and hence the cross erase is suppressed. Since the cross erase is suppressed, the storage capacity can be increased. As a result, it is possible according to the composition of the present invention to achieve the high-speed recording as well as improvement of the recording density in the optical recording medium.

When the above-mentioned β is $Sb_{2-y}In_y$, the major component of the recording film is $((Ge_{1-a}Sn_a)Te)_xSb_{2-y}In_yTe_3$ or $((Ge_{1-a}Pb_a)Te)_xSb_{2-y}In_yTe_3$. In this case, it is preferable that the real number "a" is not less than 0.2 and not more than 0.6. It is also preferable that the real number "x" is not less than 4 and not more than 8. It is also preferable that the real number "y" is equal to or more than 0.15 and less than 2. When a thickness of the recording film is equal to or less than 8 nm, the real number "a" is preferably not less than 0.3 and not more than 0.6.

When the above-mentioned β is $Sb_{2-y-z}In_yBi_z$, the major component of the recording film is $((Ge_{1-a}Sn_a)Te)_xSb_{2-y-z}In_yBi_zTe_3$ or $((Ge_{1-a}Pb_a)Te)_xSb_{2-y-z}In_yBi_zTe_3$. In this case, it is preferable that the real number "a" is not less than 0.2 and not more than 0.6. It is also preferable that the real number "x" is not less than 4 and not more than 8. It is also preferable that the real number "y+z" is equal to or more than 0.15 and less than 2, and the real number "z" is equal to or more than 0 and less than 1.85. When a thickness of the recording film is equal to or less than 8 nm, the real number "a" is preferably not less than 0.3 and not more than 0.6.

When the above-mentioned β is $Bi_{2-y}In_y$, the major component of the recording film is $((Ge_{1-a}Sn_a)Te)_xBi_{2-y}In_yTe_3$ or $((Ge_{1-a}Pb_a)Te)_xBi_{2-y}In_yTe_3$. In this case, it is preferable that the real number "a" is not less than 0 and not more than 0.3. When the real number "a" is 0, the major component of the recording film is $(GeTe)_xBi_{2-y}In_yTe_3$. It is also preferable that the real number "x" is not less than 4 and not more than 12. It is also preferable that the real number "y" is not less than 0.05 and not more than 0.4.

In a second aspect of the present invention, a method of recording data on to the above-mentioned optical recording medium is provided. The optical recording method includes (A) providing the above-mentioned optical recording medium; (B) irradiating the recording film with at least one recording pulse, the recording pulse being a pulse of the laser beam and having a recording power Pw1 which is higher than an erasing power Pe; and (C) irradiating the recording film with a bottom pulse following each of the at least one recording pulse, the bottom pulse being a pulse of the laser beam and having a bottom power Pw2 which is lower than the erasing power Pe. In the above-mentioned (C) irradiating step, the bottom power Pw2 is variably set according to a linear velocity of a recording track of the optical recording medium irradiated with the laser beam. According to the present method, the error rate which becomes conspicuous at the time of high linear velocity and high crystallization speed is suppressed.

In a case when the linear velocity of the optical recording medium is increased, a CLV (Constant Linear Velocity) driving mode is more advantageous than a CAV (Constant Angular Velocity) driving mode. In the CAV driving mode, however, the problem about the error rate becomes aggravated since the linear velocity changes to a large degree. According to the optical recording method of the present invention, the laser power between the recording pulses is controlled to vary according to the linear velocity when the data recording is carried out by using a pulse train. Due to the control, the error rate can be suppressed and an excellent recording/playing characteristic can be obtained with respect to a wider linear velocity range. That is to say, it is possible according to the present invention to carry out the data recording on the basis of the CAV mode. In the case of the CAV mode, the rotational speed of the disk is not switched, and thus the time for switching the rotational speed is unnecessary. Therefore, an effective recording speed and an effective transfer speed can be improved.

In a third aspect of the present invention, an optical recording apparatus, which records data on to the above-mentioned optical recording medium by irradiating the optical recording medium with a laser beam, is provided. The optical recording apparatus has a laser irradiating unit which irradiates the optical recording medium with the laser beam, and a controller which controls the irradiation by the laser irradiating unit. Based on the control by the controller, the laser irradiating unit irradiates the recording film with at least one recording pulse having a recording power Pw1 which is higher than an erasing power Pe, and irradiates the recording film with a bottom pulse following each of the at least one recording pulse, the bottom pulse having a bottom power Pw2 which is lower than the erasing power Pe. The controller sets the bottom power Pw2 variably according to a linear velocity of a recording track of the optical recording medium irradiated with the laser beam. As a result, the error rate can be suppressed. The controller can drive the optical recording medium on the basis of the CAV mode.

According to the optical recording medium of the present invention, it is possible to enhance the crystallization speed without deteriorating the storage stability of the recording film. In addition, according to the optical recording medium of the present invention, it is possible to improve crystallization speed without increasing the cross erase. That is, not only the crystallization speed is increased but also the cross erase is suppressed according to the present invention. It is therefore possible to achieve both an enhancement of the recording density and the high-speed recording in the optical recording medium.

DESCRIPTION OF THE PREFERRED EMBODIMENTS

Embodiments of an optical recording medium, an optical recording method, and an optical recording apparatus according to the present invention will be described below with reference to the attached drawings.

Figure 1:
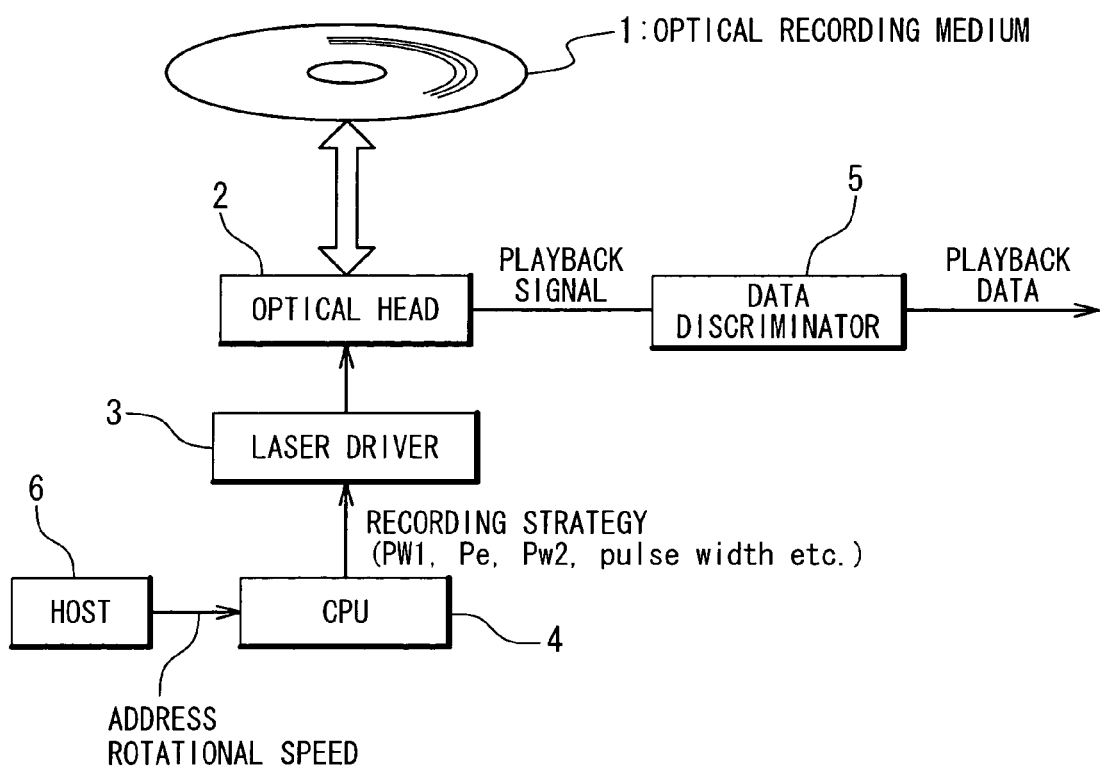
FIG. 1 is a block diagram showing a configuration of an optical recording apparatus according to an embodiment of the present invention.

FIG. 1 is a block diagram schematically showing a configuration of an optical recording apparatus according to an embodiment of the present invention. The optical recording apparatus carries out recording and playing data by irradiating an optical recording medium 1 with a laser beam. The optical recording medium 1 is, for example, a phase-change optical disk such as a CD-RW or a DVD-RW. The optical recording apparatus has an optical head 2, a laser driver 3, a CPU 4 and a data discriminator 5.

The optical head 2 includes a lens, a laser beam source such as a laser diode or the like which irradiates the optical recording medium 1 with the laser beam (laser pulse), a light receiving element which receives a reflected light from the optical recording medium 1, and so on. As the laser diode, for example, a blue laser diode whose wavelength is 400 to 430 nm. The laser driver 3 drives the laser beam source such as the laser diode in response to commands from the CPU 4. These optical head 2 and the laser driver 3 configure a "laser irradiating unit" which irradiates the optical recording medium 1 with the laser beam. The laser irradiating unit irradiates laser pulses based on a control by the CPU 4. The data discriminator 5 receives a playback signal detected by the light receiving element of the optical head 2, and converts it to a playback data.

The CPU 4 (controller) controls the laser beam irradiation by the above-mentioned laser irradiating unit and a disk rotation by a spindle motor (not shown), based on the aftermentioned recording strategy. More specifically, the CPU 4 receives from a host 6 such information as a target address on the disk to be recorded, a disk rotational speed at the time of the recording and so on. Then, the CPU 4 calculates a linear velocity of the disk on the basis of the information, and generates a recording strategy. The recording strategy includes a recording power Pw1, and erasing power Pe, a bottom power Pw2, a pulse width and the like, which will be described later. In the present embodiment, the CPU 4 can change the recording power Pw1, the erasing power Pe, and the bottom power Pw2 according to the disk linear velocity. The recording strategy is outputted to the laser driver 3, and the laser driver 3 drives laser pulses according to the recording strategy. Also, the spindle motor which is not shown rotates the disk at a rotational speed in accordance with the disk rotational speed instructed by the CPU 4. For example, the optical recording medium 1 is driven on the basis of the CAV (Constant Angular Velocity) mode.

The data recording on the phase-change optical recording medium 1 is performed by amorphzing a recording film of the phase-change optical recording medium 1. The amorphized section is called a "mark (amorphous mark)". A data length of a record data associated with a mark is called a "mark data length". When a reference clock cycle (channel cycle) is "T", a mark on the disk associated with an nT mark data length is referred to as a "nT mark" hereinafter (n is a natural number). For example, a "4T mark" on the disk is associated with a record data whose mark data length is "4T".

Figure 2:
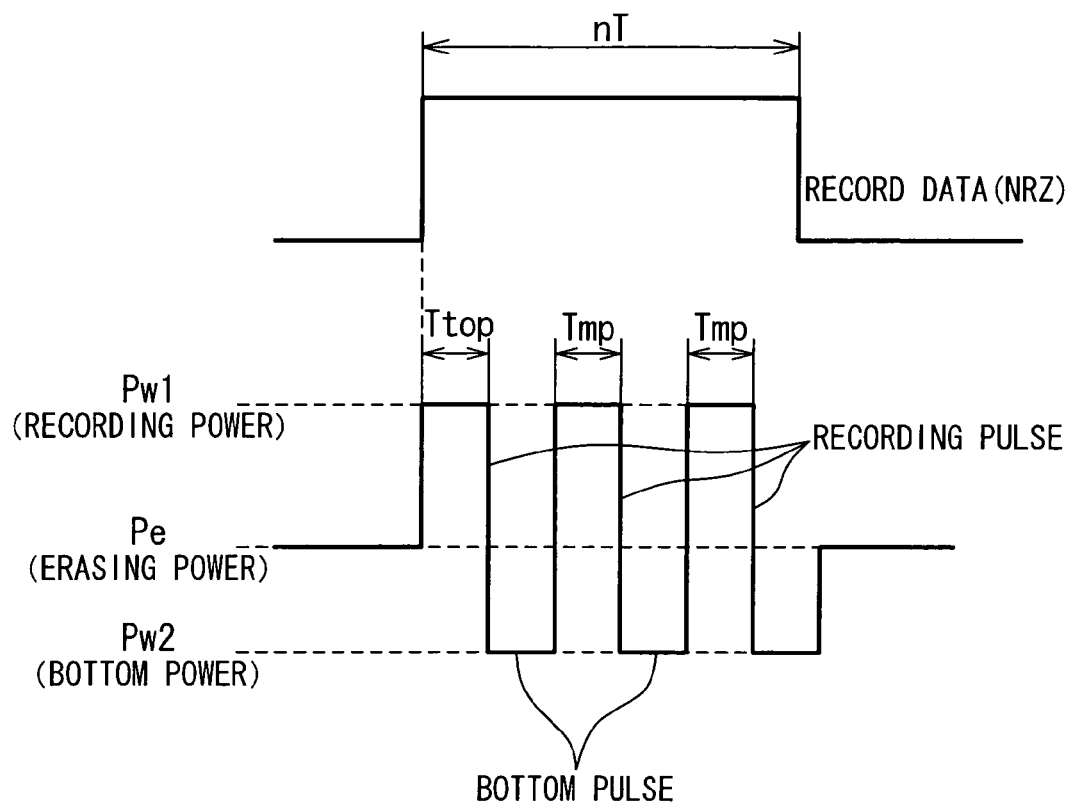
FIG. 2 is a waveform diagram showing a method of recording data on an optical recording medium according to the embodiment of the present invention.

FIG. 2 is a waveform diagram showing a method of recording data on the optical recording medium 1 according to the present embodiment, and shows an example of the recording strategy. As an example, a recording strategy with regard to a record data whose mark data length is 4T (n=4) is shown in FIG. 2. In this case, a 4T mark is formed on the optical recording medium 1. As shown in FIG. 2, a pulse train consisting of a plurality of laser pulses is irradiated at the time of data recording. The pulse train is produced by the laser irradiating unit based on the control by the CPU 4.

More specifically, the pulse train includes a plurality of recording pulses and a plurality of bottom pulses as the laser pulses. The recording pulses and the bottom pulses are alternately irradiated as shown in FIG. 2. That is to say, the optical recording medium 1 is irradiated with a recording pulse followed by a bottom pulse. A power of the recording pulse is a recording power Pw1 higher than an erasing power Pe. On the other hand, a power of the bottom pulse between the recording pulses is a bottom power Pw2 lower than the erasing power Pe. A pulse width of the first recording pulse (first pulse) is Ttop. A pulse with of the following recording pulses is Tmp. An erasing level laser having the erasing power Pe is irradiated before and after the pulse train. In the present embodiment, the bottom power Pw2 is variably set at the time of data recording, according to the linear velocity of a recording track of the optical recording medium 1. The levels of the recording power Pw1 and the erasing power Pe may be adjusted according to needs.

Figure 3:
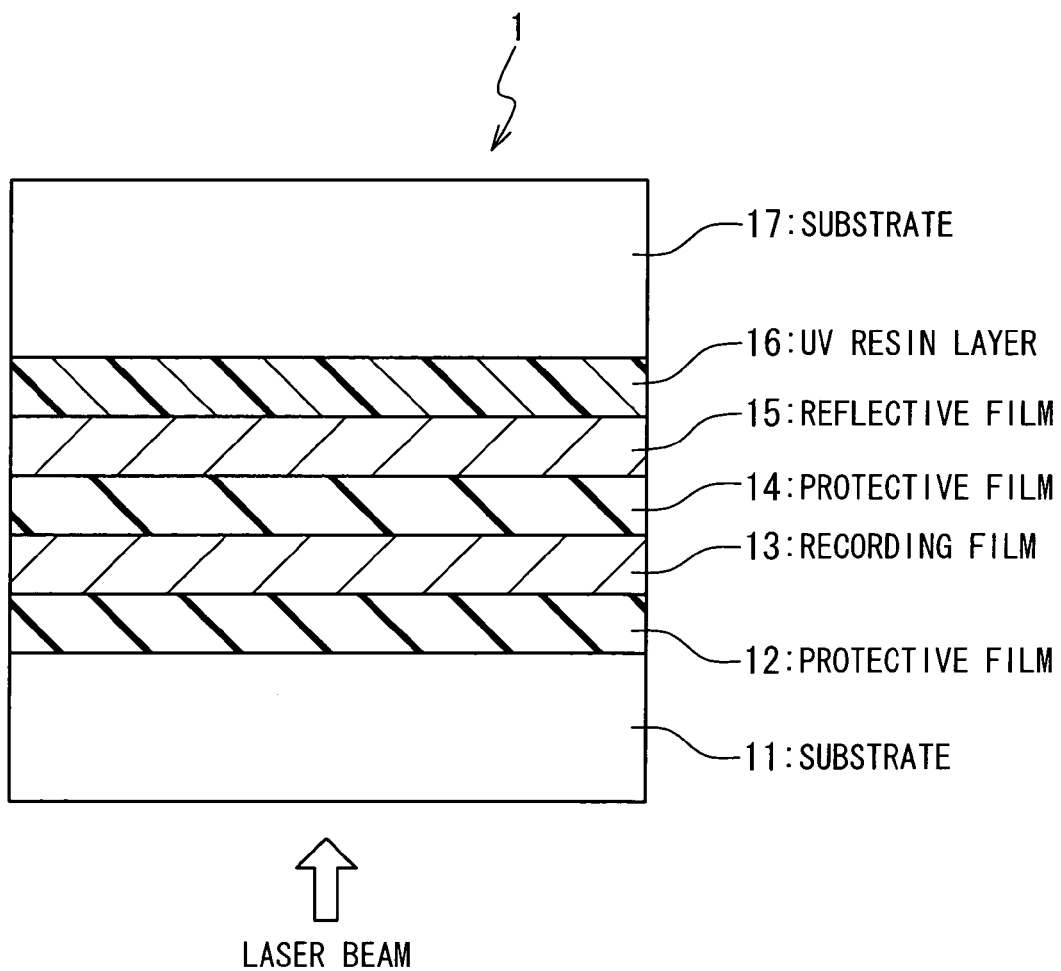
FIG. 3 is a cross-sectional view showing a structure of the optical recording medium according to the embodiment of the present invention.

Next, FIG. 3 shows a cross-section of the optical recording medium 1 according to the present embodiment. As shown in FIG. 3, a protective film 12, a recording film 13, a protective film 14, and a reflective film 15 are stacked in this order on a substrate 11 which is a base. Also, a UV resin layer 16 is formed on the reflective film 15, and a substrate 17 is attached to the UV resin layer 16. A boundary layer may be added between the protective film 12 and the recording film 13, or between the recording film 13 and the protective film 14. Further, a dielectric film may be added on the reflective film 15 for improving a machine characteristic and an endurance of the disk. A guide groove used for the tracking of the laser beam is formed on the substrate 11, which is not shown. The laser beam for the recording and playing is irradiated from a side of a back surface of the substrate 11. Due to the irradiation of the laser beam, a property of the recording film 13 such as a reflection coefficient or an optical phase is changed. As a result, the record data is recorded on to the optical record medium 1. It should be noted that a reflective film, a protective film, a recording film, and a protective film may be stacked in this order on the substrate 11. In this case, the laser beam is irradiated from the opposite side.

As the substrates 11 and 17, a polycarbonate (PC) substrate or a glass substrate can be used, for example. As the protective films 12 and 14, an insulating film such as SiN, $SiO_2$, $TaO_x$, $Al_2O_3$, AlN and ZnS—$SiO_2$, or a stacked film thereof can be used. As the reflective film 15, a metal film consisting of Al, Ag or Au, or a alloy film including such metals as a major component.

According to the present embodiment, the recording film 13 includes $(\alpha Te)_x \beta Te_3$ as a major component (x is a positive real number). Here, the $\alpha$ is selected from the group consisting of $Ge_{1-a}Sn_a$ and $Ge_{1-a}Pb_a$ (a is a real number not less than 0 and not more than 1). The $\beta$ is selected from the group consisting of $Sb_{2-y}In_y$, $Sb_{2-y-z}In_yBi_z$ and $Bi_{2-y}In_y$ (y and z are real numbers more than 0 and less than 2; y+z is more than 0 and less than 2). It is preferable that a rate of content of the major component in the recording film 13 is equal to or more than 95%. Such elements as Ge, Sb, Te, Ag, Cr, $N_2$, Co and so on may be added to the recording film 13 in addition to the major component.

When the above-mentioned $\beta$ is $Sb_{2-y}In_y$, the major component of the recording film 13 is any of the followings:

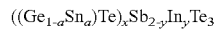

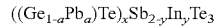

When the above-mentioned $\beta$ is $Sb_{2-y-z}In_yBi_z$, the major component of the recording film 13 is any of the followings:

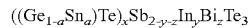

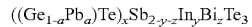

When the above-mentioned $\beta$ is $Bi_{2-y}In_y$, the major component of the recording film 13 is any of the followings:

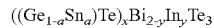

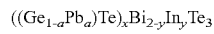

As described above, the optical recording medium 1 according to the present embodiment has a characteristic in the recording film 13. The inventor found that it is possible to increase the crystallization speed and to suppress the cross erase by using the recording film 13. To demonstrate effects obtained by using the recording film 13, results of experiments carried out by the inventor are presented hereinafter.

FIRST EXAMPLE

In the optical recording medium (optical disk) 1 according to the first example, the substrate 11 is a PC (polycarbonate) substrate having a thickness of 0.6 mm. The grooves having a pitch of 0.68 μm and depth of 45 nm are formed on the PC substrate. The data recording is performed for both the lands and the grooves. The protective film 12 is a multilayer film in which $ZnS-SiO_2$, $SiO_2$ and $ZnS-SiO_2$ are stacked in this order. The protective film 14 is a $ZnS-SiO_2$ film. The reflective film 15 is an Ag film having a thickness of 100 nm. The recording film 13 includes $((Ge_{1-a}Sn_a)Te)_x Sb_{2-y} In_y Te_3$ as the major component. The thickness of the recording film 13 is 12 nm. Also, a GeN boundary layer with a thickness of 5 nm is inserted between the protective film 12 and the recording film 13, and between the recording film 13 and the protective film 14.

In the optical recording medium 1, the parameters a, x and y regarding the composition of the recording film 13 are set to various values. That is, a plurality kinds of optical disks having different recording films 13 with different compositions $(((Ge_{1-a}Sn_a)Te)_x Sb_{2-y} In_y Te_3)$ are prepared. Then, recording/playing evaluations are carried out for respective of the plurality of optical disks. In a recording/playing evaluation, an optical disk is rotated at a linear velocity of 11.2 m/s. The clock frequency is 129.6 MHz, and the clock cycle T is 7.7 ns. Also, the optical heads 2 which is used includes an objective lens whose numerical aperture (NA) is 0.65 and wavelength is 405 nm. The recording power Pw1 is set to 5.8 mW, the bottom power Pw2 is set to 0.3 mW, and the erasing power Pe is set to 2.4 mW.

Under such a condition, a "8T mark (8T signal)" is overwritten with a "3T mark", and an erase ratio (unit: dB) of the "8T mark" is measured. Also, a "8T mark" is recorded to the groove, and a carrier level C0 of the "8T mark" is measured. After that, a random signal is recorded to a land, i.e., an adjacent track. Then, a carrier level C1 of the "8T mark" in the groove is measured again, and a cross erase (C0-C1) is calculated. A relation of the erase ratio and the cross erase thus obtained to the recording film composition (parameters a, x and y) is summarized in the following Tables. 1 to 3.

TABLE 1

| a | x | y | ERASE RATIO (dB) | CROSS ERASE (dB) |
|---|---|---|---|---|
| 0.15 | 4 | 0.3 | 18 | 0 |
| 0.18 | 4 | 0.3 | 23 | 0 |
| 0.2 | 4 | 0.3 | 26 | 0 |
| 0.4 | 4 | 0.3 | 35 | 0 |
| 0.6 | 4 | 0.3 | 30 | 0 |
| 0.63 | 4 | 0.3 | 30 | 0 |
| 0.65 | 4 | 0.3 | 30 | 0 |

Shown in the above Table. 1 is a result in a case when the parameters "x, y" are fixed, and the parameter "a" regarding the amount of Sn content is changed. It can be seen from Table. 1 that the erase ratio is increased (improved) as the parameter "a" increases. In general, a lower limit of the erase ratio required for realizing the overwriting is about 26 dB. In order to achieve the erase ratio of the lower limit 26 dB, it is preferable that the parameter "a" regarding the Sn content is equal to or more than 0.2.

TABLE 2

| a | x | y | ERASE RATIO (dB) | CROSS ERASE (dB) |
|---|---|---|---|---|
| 0.2 | 4 | 0.1 | 26 | 1.5 |
| 0.2 | 4 | 0.13 | 27 | 0.8 |
| 0.2 | 4 | 0.15 | 26 | 0 |
| 0.2 | 4 | 0.3 | 28 | 0 |
| 0.2 | 4 | 1.0 | 28 | 0 |
| 0.2 | 4 | 1.7 | 26 | 0 |

Shown in the above Table. 2 is a result in a case when the parameter "a" is fixed to 0.2, the parameter "x" is fixed to 4, and the parameter "y" regarding the amount of In content is changed. It can be seen from Table. 2 that the parameter "y" regarding the amount of In content is preferably equal to or more than 0.15 in order to suppress the cross erase.

TABLE 3

| a | x | y | ERASE RATIO (dB) | CROSS ERASE (dB) |
|---|---|---|---|---|
| 0.6 | 8 | 0.1 | 33 | 3 |
| 0.6 | 8 | 0.13 | 34 | 1.5 |
| 0.6 | 8 | 0.15 | 33 | 0 |
| 0.6 | 8 | 0.3 | 33 | 0 |
| 0.6 | 8 | 1.0 | 32 | 0 |
| 0.6 | 8 | 1.7 | 32 | 0 |

Shown in the above Table. 3 is a result in a case when the parameter "a" is fixed to 0.6, the parameter "x" is fixed to 8, and the parameter "y" is changed. In this case also, the parameter "y" regarding the amount of In content is preferably equal to or more than 0.15 in order to suppress the cross erase. In other words, when the parameter "y" is equal to or more than 0.15, an excellent cross erase characteristic can be obtained regardless of the parameters "a" and "x".

The thickness of the recording film 13 is 12 nm in the above-described example. It should be noted however that even when the thickness is 10 to 18 nm, no conspicuous difference can be found as compared with the above-described result. When the recording film 13 is made thinner and its thickness becomes 6 to 8 nm, an excellent erase ratio equal to or more than 26 dB can be obtained when the parameter "a" is equal to or more than 0.3.

SECOND EXAMPLE

In the second example, the configuration of the optical disk and the substrate are the same as in the first example. The linear velocity and the clock frequency are the same as in the first example. Similarly to the first example, the parameters a, x and y regarding the composition of the recording film 13 are set to various values. Then, the number of rewrites (the number of times the optical disk can be rewritten) is measured with respect to each optical disk. More specifically, a "8T mark" is repeatedly overwritten by another "8T mark", and a dependence of the C/N ratio (a ratio of carrier level to noise level) of the 8T mark on the number of rewrites is investigated. Here, the "number of rewrites" is determined as a number of writing with which a C/N ratio deteriorates by 3 dB as compared with a C/N ratio immediately after the first writing. Table. 4 shows a relationship between the number of rewrites and the recording film composition.

TABLE 4

| a | x | y | NUMBER OF REWRITES |
|---|---|---|---|
| 0.4 | 8 | 0.3 | 2000 |
| 0.6 | 8 | 0.3 | 2000 |
| 0.63 | 8 | 0.3 | 1500 |
| 0.7 | 8 | 0.3 | 800 |
| 0.4 | 8 | 1.7 | 1800 |
| 0.6 | 8 | 1.7 | 1800 |
| 0.63 | 8 | 1.7 | 1300 |
| 0.7 | 8 | 1.7 | 800 |

It can be seen from the above Table. 4 that the number of rewrites decreases rapidly if the parameter "a" regarding the amount of Sn content exceeds 0.6. Such a tendency can be seen whether the parameter "y" is 0.3 or 1.7. In order to keep the number of rewrites, the parameter "a" regarding the amount of Sn content is preferably equal to or less than 0.6. To combine the results from the first and the second examples, it is preferable that the parameter "a" is not less than 0.2 and not more than 0.6.

THIRD EXAMPLE

In the third example, the configuration of the optical disk and the substrate are the same as in the first example. The linear velocity and the clock frequency are the same as the first example. Similarly to the first example, the parameters a, x and y regarding the composition of the recording film 13 are set to various values. Then, an optimum recording power is measured with respect to each optical disk. More specifically, 8T marks are recorded with changing the recording power Pw1, and then a C/N ratio and a second-order harmonic distortion (2nd H/C) are measured with respect to each 8T mark. An optimum recording power is determined as a recording power Pw1 with which the 2nd H/C is minimum. Table. 5 shows a relationship between the optimum recording power and the recording film composition, and a relationship between the C/N ratio in the case of the optimum recording power and the recording film composition.

TABLE 5

| a | x | y | 8TC/N (dB) | OPTIMUM RECORDING POWER (mW) |
|---|---|---|---|---|
| 0.2 | 3.6 | 0.3 | 51 | 5.7 |
| 0.6 | 3.6 | 0.3 | 50.5 | 5.7 |
| 0.2 | 4 | 0.3 | 53 | 6.0 |
| 0.6 | 4 | 0.3 | 53 | 6.0 |
| 0.2 | 8 | 0.3 | 53.5 | 6.5 |
| 0.6 | 8 | 0.3 | 53.5 | 6.5 |
| 0.2 | 8.5 | 0.3 | 53 | 7.5 |
| 0.6 | 8.5 | 0.3 | 53.5 | 7.5 |

As is seen from the above Table. 5, high C/N ratios can be obtained when the parameter "x" is equal to or more than 4. Such a tendency can be seen whether the parameter "a" is 0.2 or 0.6. On the other hand, the optimum recording power required for the data recording increases as the parameter "x" increases. In particular, the increase in the optimum recording power is remarkable when the parameter "x" exceeds 8. Higher recording power causes an increase in the laser load, which results in a deterioration of the laser quality. Therefore, the lower recording power is more desirable. Thus, the parameter "x" regarding the amount of Ge content is preferably not less than 4 and not more than 8.

To summarize the results from the first to the third examples mentioned above, the preferred ranges of the parameters a, x and y in the recording film 13 including $((Ge_{1-a}Sn_a)Te)_xSb_{2-y}In_yTe_3$ as a major component are as follows.

(1) The amount of Ge content in the recording film 13 is calculated from "(1-a)x". From the viewpoint of the recording power and the C/N ratio, it is preferable that the parameter "x" is not less than 4 and not more than 8 regardless of the parameter "a" (refer to the third example).

(2) The amount of Sn content in the recording film 13 is calculated from "ax". There is a tendency that the crystallization speed increases with increasing Sn content. That is, the erase ratio under the condition of the high linear velocity becomes high with increasing Sn content. When the parameter "x" is 4 (x=4) which is the lower limit of the preferred range, the parameter "a" should be equal to or more than 0.2 in order to achieve the excellent erase ratio not less than 26 dB (see Table. 1). While, the number of rewrites decreases if the Sn content increases more than necessary. When the parameter "x" is 8 (x=8) which is the upper limit of the preferred range, the parameter "a" is preferably equal to or less than 0.6 in order to ensure an excellent repeating characteristic (number of rewrites). Thus, it is preferable that the parameter "a" is not less than 0.2 and not more than 0.6 (refer to the first and second examples).

(3) The amount of In content in the recording film 13 is calculated from "y". When the parameter "y" is equal to or more than 0.15, the cross erase can be reduced (see Tables. 2 and 3). That is to say, it is possible to improve the cross erase characteristic by replacing a part of Sn by In. The amount of Sb content is expressed by "2-y", and the parameter "y" is less than 2. Therefore, it is preferable that the parameter "y" is equal to or more than 0.15 and less than 2 (refer to the first example).

It should be noted that the reduction effect of the cross erase due to the In addition is independent from the thickness of the recording film 13. Also, the preferred range of the Ge content obtained from the view point of the recording power and the C/N ratio is independent from the thickness of the recording film 13. Thus, the preferred ranges of the parameters x and y are independent from the thickness of the recording film 13. When the recording film 13 is made thinner and its thickness becomes 6 to 8 nm, the parameter "a" is preferably equal to or more than 0.3, as described in the first example. In other words, when the thickness is equal to or less than 8 nm, it is preferable that the parameter "a" is not less than 0.3 and not more than 0.6.

As described above, by replacing a part of Ge by Sn, the crystallization speed is increased and thereby the sufficient erasability is ensured even in a condition of the high linear velocity. In general, the increase in the crystallization speed causes the deterioration of the storage stability and the cross erase characteristic of the recording film 13. However, according to the present invention, the storage stability of the recording film 13 enhances by replacing a part of Sb by In, and thus the cross erase is suppressed. In other words, it is possible by replacing a part of Sb by In to suppress the cross erase without reducing the crystallization speed. Since the cross erase is suppressed, the storage capacity can be increased. As described above, it is possible according to the present invention to achieve both the high-speed recording and the increase of the recording density with regard to the optical recording medium 1. In other words, a phase-change optical disk supporting the high-speed recording and having the high storage capacity can be attained. Moreover, according to the present invention, the recording power pw1 is reduced and the C/N ratio is improved by optimizing the Ge amount in the recording film 13.

FOURTH EXAMPLE

A method for improving the crystallization speed is not limited to the above-mentioned method in which a part of Ge is replaced by Sn. For example, a part of Ge can be replaced by Pb in order to increase the crystallization speed. As for the cross erase suppression, a part of Sb is replaced by In as in the foregoing examples. In the present example, the recording film 13 includes $((Ge_{1-a}Pb_a)Te)_xSb_{2-y}In_yTe_3$ as a major com- When the parameter "a" is 0, the major component of the recording film 13 is $(GeTe)_xBi_{2-y}In_yTe_3$. The recording characteristics (the C/N ratio, the erase ratio, the cross erase, the optimum recording power, and the number of rewrites) are measured for such recording films 13. The configuration of the optical disk and the substrate are the same as in the first example. The linear velocity and the clock frequency are the same as in the first example. Table. 6 shows a relationship between the recording film composition and the recording characteristics.

TABLE 6

| GROUP | a | x | y | C/N (dB) | ERASE RATIO (dB) | CROSS ERASE (dB) | OPTIMUM RECORDING POWER (mW) | NUMBER OF REWRITES |
|---|---|---|---|---|---|---|---|---|
| 1 | 0 | 3.6 | 0.05 | 51 | 33 | 0 | 5.7 | 2000 |
| 1 | 0 | 4 | 0.05 | 53 | 33 | 0 | 6 | 2000 |
| 1 | 0 | 12 | 0.05 | 54 | 32 | 0 | 6.5 | 2000 |
| 1 | 0 | 13 | 0.05 | 53 | 31 | 0 | 8 | 2000 |
| 2 | 0 | 10 | 0.03 | 54 | 35 | 1.3 | 6.5 | 2000 |
| 2 | 0 | 10 | 0.05 | 54.2 | 33 | 0 | 6.5 | 2000 |
| 2 | 0 | 10 | 0.4 | 54.5 | 28 | 0 | 6.5 | 2000 |
| 2 | 0 | 10 | 0.45 | 53 | 23 | 0 | 6.5 | 1000 |
| 3 | 0.1 | 12 | 0.05 | 53.7 | 36 | 0 | 6.4 | 1500 |
| 3 | 0.3 | 12 | 0.05 | 53.7 | 34 | 0 | 6.4 | 1200 |
| 3 | 0.35 | 12 | 0.05 | 53.7 | 34 | 0 | 6.4 | 800 | ponent. Preferred ranges of the parameters a, x and y are the same as in the foregoing examples.

FIFTH EXAMPLE

In order to improve the crystallization speed, a part of Sb is further replaced by Bi. As for the cross erase suppression, a part of Sb is replaced by In as in the foregoing examples. In this case, the major component of the recording film 13 is any of the followings:

$$((Ge_{1-a}Sn_a)Te)_xSb_{2-y-z}In_yBi_zTe_3$$

$$((Ge_{1-a}Pb_a)Te)_xSb_{2-y-z}In_yBi_zTe_3$$

When the parameter "a" is 0, the major component of the recording film 13 is $(GeTe)_xSb_{2-y-z}In_yBi_zTe_3$.

The cross erase characteristic is investigated for such recording films 13. As a result, it is found that the cross erase is sufficiently suppressed when the parameter "y" regarding the amount of In content is equal to or more than 0.15 as in the first example. That is, the parameter "y" is preferably equal to or more than 0.15 and less than 2. The amount of Sb content is expressed as "2-y-z", and the parameter "y+z" is less than 2. Therefore, the parameter "z" regarding the amount of Bi content is equal to or more than 0 and less than 1.85. Therefore, the parameter "y+z" is equal to or more than 0.15 and less than 2. A case when the parameter "z" is 0 results in the same recording film composition as in the above-described examples. As for the parameters "a" and "x", their preferred ranges are the same as in the foregoing examples.

SIXTH EXAMPLE

According to the present example, all of Sb is replaced by Bi and In. In this case, the major component of the recording film 13 is any of the followings:

$$((Ge_{1-a}Sn_a)Te)_xBi_{2-y}In_yTe_3$$

$$((Ge_{1-a}Pb_a)Te)_xBi_{2-y}In_yTe_3$$

In a Group (1), the parameter "a" is 0. Namely, the major component of the recording film 13 is $(GeTe)_xBi_{2-y}In_yTe_3$. This Group (1) relates to experiments for the purpose of investigating a preferred range of the parameter "x" associated with the amount of GeTe content. According to the present example in which all of Sb is replaced by Bi and In, the increase in the optimum recording power associated with the increase in the parameter "x" is more gradual as compared with the above-mentioned third example in which a part of Sb is replaced. When the parameter "x" is not less than 4 and not more than 12, it is possible to achieve the improvement of the C/N ratio and the suppression of the optimum recording power. Therefore, it is preferable that the parameter "x" is not less than 4 and not more than 12.

In a Group (2) also, the parameter "a" is 0. This Group (2) relates to experiments for the purpose of investigating a preferred range of the parameter "y" associated with the amount of In content. According to the present example in which all of Sb is replaced by Bi and In, the cross erase can be suppressed with less In content as compared with the above-mentioned first example in which a part of Sb is replaced. In order to suppress the cross erase, it is preferable that the parameter "y" is equal to or more than 0.05. On the other hand, when the amount of In content increases, the erase ratio decreases conspicuously. To realize the erase ration equal to or more than 26 dB, the parameter "y" should be equal to or less than 0.4. As described above, it is preferable that the parameter "y" is not less than 0.05 and not more than 0.4. Accordingly, both of the high erase ratio and the suppression of the cross erase can be achieved.

In a Group (3), the parameter "a" is more than 0. That is to say, all of Sb is replaced by Bi and In, and furthermore a part of Ge is replaced by Sn or Pb. The parameters "x" and "y" are set to 12 and 0.05 to match the above-mentioned preferred ranges, respectively. According to the Group (3), the erase ratio is generally improved as compared with the recording film according to the foregoing Groups. On the other hand, the number of rewrites decreases rapidly as the parameter "a" increases. When a lower limit of the practically allowable number of rewrites is 1000, the parameter "a" should be equal to or less than 0.3. It is possible to improve the erase ratio and to ensure the number of rewrites.

To summarize these results, the preferred conditions in the sixth example are that the parameter "a" is not less than 0 and not more than 0.3, the parameter "x" is not less than 4 and not more than 12, and the parameter "y" is not less than 0.05 and not more than 0.4.

SEVENTH EXAMPLE

In the seventh example, the data is recorded with changing the linear velocity, and then error rates are measured. The configuration of the optical disk and the substrate are the same as in the first example. The recording film 13 includes $((Ge_{1-a}Sn_a)Te)_xSb_{2-y}In_yTe_3$ as a major component. The parameters a, x and y are set to 0.4, 6 and 0.3, respectively. When the linear velocity is 5.6 m/s, the clock frequency is set to 64.8 MHz. When the linear velocity is 11.2 m/s, the clock frequency is set to 129.6 MHz. When the linear velocity is 14 m/s, the clock frequency is set to 162 MHz. Table. 8 shows a relationship between the recording condition and the error rate.

TABLE 7

| LINEAR VELOCITY (m/s) | Ttop (T) | Tmp (T) | Pw1 (mW) | Pw2 (mW) | Pe (mW) | ERROR RATE |
|---|---|---|---|---|---|---|
| 5.6 | 0.3 | 0.3 | 5.6 | 0.1 | 2.3 | $2 \times 10^{-5}$ |
| 5.6 | 0.3 | 0.3 | 5.6 | 0.3 | 2.3 | $3 \times 10^{-4}$ |
| 11.2 | 0.6 | 0.6 | 5.8 | 0.1 | 2.4 | $5 \times 10^{-5}$ |
| 11.2 | 0.6 | 0.6 | 5.8 | 0.3 | 2.4 | $5 \times 10^{-6}$ |
| 14 | 0.6 | 0.6 | 5.8 | 0.3 | 2.4 | $2 \times 10^{-4}$ |
| 14 | 0.6 | 0.6 | 5.8 | 0.5 | 2.4 | $3 \times 10^{-5}$ |

As can be seen from the above Table. 7, excellent error rates can be achieved for a wide linear velocity range from 5.6 to 14 m/s by changing the bottom power Pw2 according to the linear velocity.

Figure 4:
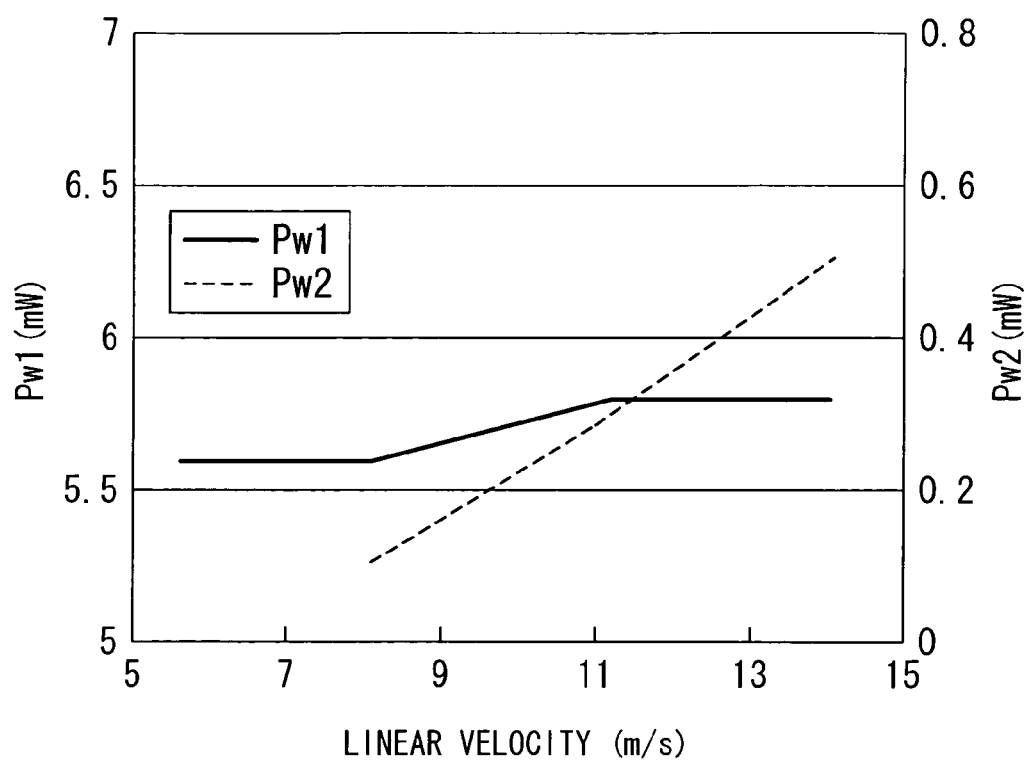
FIG. 4 is a graph showing a distribution of laser powers with which minimum error rates are obtained.

FIG. 4 shows distributions of the recording power Pw1 and the bottom power Pw2 with which the minimum error rate can be obtained. It should be noted that a dependence of the erasing power Pe on the linear velocity is similar to the dependence of the recording power Pw1 on the linear velocity, and a distribution with respect to the erasing power Pe is not shown in FIG. 4. As can be seen from FIG. 4, it is not necessary to change the recording power Pw1 (the erasing power Pe) greatly according to the linear velocity. Even when the linear velocity becomes 2.5 times larger, the recording power Pw1 is changed by about 5%. On the other hand, changing the bottom power Pw2 greatly according to the linear velocity brings about a remarkable effect in terms of the improvement of the error rate. In a case of low linear velocity, it is desirable to set the bottom power Pw2 close to 0 as possible. As the linear velocity increases, it is desirable to increase the bottom power Pw2. When the linear velocity becomes 2.5 times larger, it is preferable to increase the bottom power Pw2 by more than five times. As described above, the excellent error rates can be achieved for the wide linear velocity range from 5.6 to 14 m/s by changing the bottom power Pw2 according to the linear velocity.

The optical recording medium 1 according to the present invention has a superiority in the erasability, the cross erase characteristic and the rewriting characteristic under the condition of the high linear velocity. Also, It is possible to achieve a good balance between the improvement of the recording density and the high-speed recording. Thus, the optical recording medium 1 according to the present invention has a great deal of potential in industry.

It will be obvious to one skilled in the art that the present invention may be practiced in other embodiments that depart from the above-described specific details. The scope of the present invention, therefore, should be determined by the following claims.

What is claimed is:

1. An optical recording medium, on which data is recorded by irradiating with a laser beam, comprising:
   a substrate; and
   a recording film which is formed on said substrate and whose status is changed by irradiating with said laser beam,
   wherein said recording film includes $(\alpha Te)_x \beta Te_3$ as a major component (x is a positive real number),
   said $\alpha$ is selected from the group consisting of $Ge_{1-a}Sn_a$ and $Ge_{1-a}Pb_a$ (a is a real number not less than 0 and not more than 1), and
   said $\beta$ is selected from the group consisting of $Sb_{2-y}In_y$, $Sb_{2-y-z}In_yBi_z$ and $Bi_{2-y}In_y$ (y and z are real numbers more than 0 and less than 2; y+z is more than 0 and less than 2).

2. The optical recording medium according to claim 1, wherein said $\beta$ is $Sb_{2-y}In_y$.

3. The optical recording medium according to claim 2, wherein said real number a is not less than 0.2 and not more than 0.6.

4. The optical recording medium according to claim 2, wherein a thickness of said recording film is equal to or less than 8 nm, and
   said real number a is not less than 0.3 and not more than 0.6.

5. The optical recording medium according to claim 2, wherein said real number x is not less than 4 and not more than 8.

6. The optical recording medium according to claim 2, wherein said real number y is equal to or more than 0.15 and less than 2.

7. The optical recording medium according to claim 2, wherein said real number a is not less than 0.2 and not more than 0.6,
   said real number x is not less than 4 and not more than 8, and
   said real number y is equal to or more than 0.15 and less than 2.

8. The optical recording medium according to claim 1, wherein said $\beta$ is $Sb_{2-y-z}In_yBi_z$.

9. The optical recording medium according to claim 8, wherein said real number a is not less than 0.2 and not more than 0.6.

10. The optical recording medium according to claim 8, wherein a thickness of said recording film is equal to or less than 8 nm, and
said real number a is not less than 0.3 and not more than 0.6.

11. The optical recording medium according to claim 8, wherein said real number x is not less than 4 and not more than 8.

12. The optical recording medium according to claim 8, wherein said real number y+z is equal to or more than 0.15 and less than 2, and
said real number z is equal to or more than 0 and less than 1.85.

13. The optical recording medium according to claim 8, wherein said real number a is not less than 0.2 and not more than 0.6,
said real number x is not less than 4 and not more than 8,
said real number y+z is equal to or more than 0.15 and less than 2, and
said real number z is equal to or more than 0 and less than 1.85.

14. The optical recording medium according to claim 1, wherein said $\beta$ is $Bi_{2-y}In_y$.

15. The optical recording medium according to claim 14, wherein said real number a is more than 0 and equal to or less than 0.3.

16. The optical recording medium according to claim 14, wherein said real number x is not less than 4 and not more than 12.

17. The optical recording medium according to claim 14, wherein said real number y is not less than 0.05 and not more than 0.4.

18. The optical recording medium according to claim 14, wherein said real number a is more than 0 and equal to or less than 0.3,
said real number x is not less than 4 and not more than 12, and
said real number y is not less than 0.05 and not more than 0.4.

19. The optical recording medium according to claim 14, wherein said real number a is 0, and
said recording film includes $(GeTe)_xBi_{2-y}In_yTe_3$ as a major component.

20. The optical recording medium according to claim 19, wherein said real number a is more than 0 and equal to or less than 0.3.

21. The optical recording medium according to claim 19, wherein said real number x is not less than 4 and not more than 12.

22. The optical recording medium according to claim 19, wherein said real number y is not less than 0.05 and not more than 0.4.

23. The optical recording medium according to claim 19, wherein said real number a is more than 0 and equal to or less than 0.3,
said real number x is not less than 4 and not more than 12, and
said real number y is not less than 0.05 and not more than 0.4.

24. An optical recording method comprising:
(A) providing an optical recording medium having a recording film whose status is changed by irradiating with a laser beam,
wherein said recording film includes $(\alpha Te)_x \beta Te_3$ as a major component (x is a positive real number),
said $\alpha$ is selected from the group consisting of $Ge_{1-a}Sn_a$ and $Ge_{1-a}Pb_a$ (a is a real number not less than 0 and not more than 1), and
said $\beta$ is selected from the group consisting of $Sb_{2-y}In_y$, $Sb_{2-y-z}In_yBi_z$ and $Bi_{2-y}In_y$ (y and z are real numbers more than 0 and less than 2; y+z is more than 0 and less than 2);
(B) irradiating said recording film with at least one recording pulse,
said recording pulse being a pulse of said laser beam and having a recording power which is higher than an erasing power; and
(C) irradiating said recording film with a bottom pulse following each of said at least one recording pulse,
said bottom pulse being a pulse of said laser beam and having a bottom power which is lower than said erasing power,
wherein, in said (C) irradiating, said bottom power is variably set according to a linear velocity of a recording track of said optical recording medium irradiated with said laser beam.

25. The optical recording method according to claim 24, wherein said optical recording medium is driven on a basis of CAV (Constant Angular Velocity) mode.

26. An optical recording apparatus, which records data on to an optical recording medium by irradiating said optical recording medium with a laser beam, comprising:
a laser irradiating unit configured to irradiate said optical recording medium with said laser beam; and
a controller configured to control an irradiation by said laser irradiating unit,
wherein said optical recording medium has a recording film whose status is changed by irradiating with said laser beam,
said recording film includes $(\alpha Te)_{x\beta Te_3}$ as a major component (x is a positive real number),
said $\alpha$ is selected from the group consisting of $Ge_{1-a}Sn_a$ and $Ge_{1-a}Pb_a$ (a is a real number not less than 0 and not more than 1), and
said $\beta$ is selected from the group consisting of $Sb_{2-y}In_y$, $Sb_{2-y-z}In_yBi_z$ and $Bi_{2-y}In_y$ (y and z are real numbers more than 0 and less than 2; y+z is more than 0 and less than 2),
wherein, based on a control by said controller, said laser irradiating unit irradiates said recording film with at least one recording pulse having a recording power which is higher than an erasing power, and irradiates said recording film with a bottom pulse following each of said at least one recording pulse, said bottom pulse having a bottom power which is lower than said erasing power, and
said controller sets said bottom power variably according to a linear velocity of a recording track of said optical recording medium irradiated with said laser beam.

27. The optical recording apparatus according to claim 26, wherein said controller drives said optical recording medium on a basis of CAV (Constant Angular Velocity) mode.

* * * * *